Dec. 24, 1957　　　E. N. BRUEL　　　2,817,552
COVER LOCKING DEVICE
Filed Jan. 6, 1956

INVENTOR.
EDWARD N. BRUEL
BY
ATTORNEY

United States Patent Office 2,817,552
Patented Dec. 24, 1957

2,817,552

COVER LOCKING DEVICE

Edward N. Bruel, New York, N. Y.

Application January 6, 1956, Serial No. 557,803

2 Claims. (Cl. 292—259)

This invention relates to cover guards for receptacles having a removable cover and body handles, as distinguished over the can cover guard disclosed in co-pending application Serial No. 528,398, filed August 15, 1955, and now abandoned, wherein a peripheral band encircles the can body and supports a pair of lugs, which latter are adapted to hold a cover keeper against the can cover.

The present invention represents a substantial simplification over the one disclosed in the above-mentioned application, in that such peripheral band is eliminated and the entire structure is made more practical both as to its manufacture and its application to a receptacle, whereby the cost of the device is materially reduced and its effectiveness is greatly enhanced.

The prime object of this invention therefore is the provision of a very simple, effective and inexpensive cover guard for a receptacle having a removable cover, preferably equipped with a handle, and wherein the body of the receptacle is provided with a pair of oppositely disposed handles.

A further object of this invention is the provision of a cover guard for receptacles having a removable cover and body handles, and which cover guard comprises two like, simply constructed, relatively adjustable and interlocking members made from resilient material, and which members are adapted to be placed over the cover of a receptacle, and wherein the interlocking or inner portions of the members are preferably placed under the cover handle, and wherein from the interlocking portions of the members extend rod-like outer portions terminating in end loops, and wherein hook-forming straps are removably secured to said end loops, said straps being adapted to engage the handles of the receptacle, and while thus engaging the handles causing said members to flex, and to bring them under tension, whereby the cover is securely held against unintentional removal from the receptacle.

A still further object of this invention is the provision of an easily applicable and easily releasable cover guard in which are employed two relatively adjustable resilient members having interior interlocking portions and substantially straight-lined, elongated, outer portions extending from their interlocking portions, and wherein said outer portions are adapted to project beyond the periphery of a receptacle cover, and wherein to the projecting ends of the members are operatively secured hook-forming bands, the hooks of which are adapted to removably engage the body handles of the receptacle.

The foregoing and a number of other important objects and advantages of the present invention will become more fully apparent from the ensuing description in conjunction with the accompanying drawings, wherein.

Figure 1:
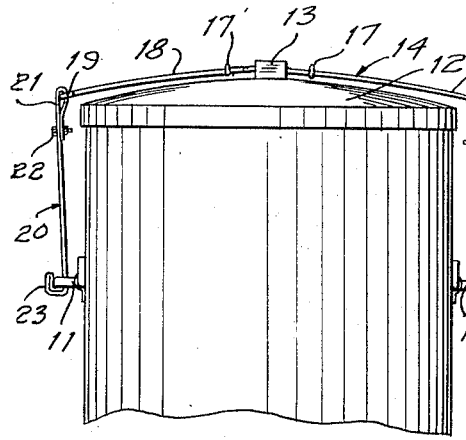
Fig. 1 illustrates a partial elevation of a receptacle provided with a removable cover and body handles and showing the present cover guard in its cover-holding position.

In the drawings numeral 10 denotes a receptacle, such as a garbage can, provided with body handles 11 and having a removable cover 12 which also is provided with a handle 13.

Resting against the top of cover 12 and passing through cover handle 13 is cover guard 14 composed, in combination, of two resilient, interlocking like members 15, 15', whose interlocking or inner portions 16, 16' are doubly crimped or offset and terminate in loops 17, 17'. These loops encircle, respectively, substantially straight-linear, elongated, what may be termed outer portions 18, 18' extending from the crimped portions 16, 16' in radially outward direction. These outer portions 18, 18' terminate, respectively, in loops 19, 19'. Removably secured to these loops are perforated band-like straps 20, 20', the upper ends of which are bent upon themselves to form slips 21, 21' as shown clearly in Fig. 4. The bent ends of these slips are passed through loops 19, 19', whereupon they are bolted or otherwise fastened, as at 22, 22', to the bodies of the straps. The other ends of straps 20, 20' are doubled upon themselves and formed into thus reinforced hooks 23, 23' adapted to engage body handles 11 of the receptacle.

Figure 2:
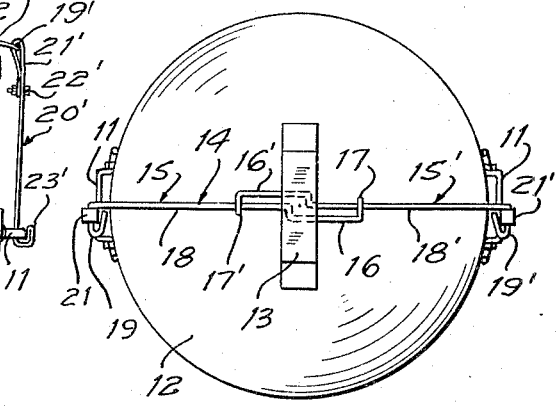
Fig. 2 is a top view of Fig. 1.
Figure 3:
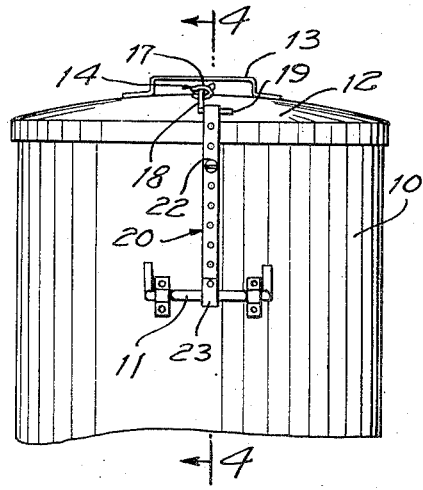
Fig. 3 is a side elevation of Fig. 1.

The above referred to double crimping of the interlocking portions 16, 16' of the two members 15, 15' can be best understood by observing Fig. 2. There will be seen in broken lines beneath handle 13 of cover 12 the first or interior offsets or crimps of the two members. Outside of handle 13 are seen in full lines the second or exterior offsets of the members, and which second offsets are formed into loops 17, 17' encircling the straight linear portions of members 15, 15'.

This double crimping or offsetting is chosen advisedly since by its provision both the inward as well as the outward movement of the two members is effectively limited. The inward movement of the members, that is their movement in axial direction toward each other, is arrested when the first offsets or crimps, shown in broken lines in Fig. 1, contact one another. The outward movement of the members is stopped when loops 17, 17' engage these first offsets.

By limiting the relative movement of the two members, their excessive projection beyond a can cover and their excessive contraction in respect to the outer periphery of the cover is prevented, whereby the attachment of the present device to and its temporary disengagement from a can is materially facilitated.

Figure 4:
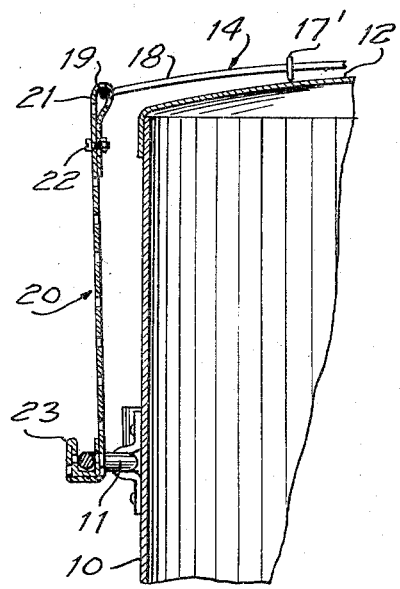
Fig. 4 is a partial vertical section, somewhat enlarged, taken approximately along lines 4—4 of Fig. 3.
Figure 5:
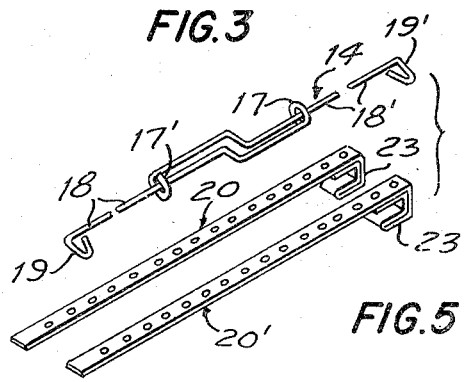
Fig. 5 is a perspective illustration of the several parts comprising the cover guard according to the present invention.

It will be observed from Figs. 1 and 4, that the two interlocking members of cover guard 14, made from resilient material, are flexed when hook-shaped elements 20, 20' engage handles 11, thus bringing the whole guard structure under tension, whereby cover 12 is tightly held against the top end of receptacle 10. Thus the cover can be removed only when hooks 23, 23' of straps 20, 20' are disengaged from handles 11.

As can be readily observed from the illustrations, the present device is extremely simple in construction and therefore inexpensive in its manufacture. Moreover, it can be readily applied without the use of tools of any kind to substantially any receptacle having a removable cover and body handles. While adjustable members 18, 18' of cover guard 14 are shown passed through handle 13 of the cover, these members may be placed in parallel relation to the cover handle and still hold the cover against the receptacle, as long as the guard firmly presses against the top of the cover by the action of bands 20, 20' engaging with their hooks 23, 23' the oppositely disposed handles of the receptacle. Obviously straps or bands 20, 20' need not be of the perforated type, however the use of perforated bands is eminently adaptable for forming reinforced hook ends 23, 23', and for connecting the bent-down portions of slips 21, 21' with the bodies of the bands. Similarly the use of resilient wire for producing guard members 15, 15' in the shape shown further adds to the simplicity and inexpensiveness of the device.

Having thus described the present invention, what is claimed as new is:

1. The combination with a receptacle having a removable cover with a handle and at least two body handles, of a cover locking device comprising two interlocked, bodily adjustable, resilient members, fastening straps operatively and removably associated with the outer ends of the members, the free ends of the strap forming hooks, said members passing through the handle of the cover and the strap hooks being adapted to removably engage the body handles, whereby said members are flexed and brought under tension, the interlocking arrangement of the members comprising a double crimping at their interlocking portions, said double crimping constituting an inner or first crimp and a terminal or second crimp, the latter crimp being shaped into a loop, the loops and the inner crimps of the two members being adapted to limit their relative movements in both outward and inward directions, that is the engagement by the loops of the inner crimps limiting the outward movement of the members, and the abutment of the inner crimps with one another limiting the inward movement of the members.

2. In a cover guard for receptacles having body handles a pair of resilient, lengthwise adjustable interlocking cover-engaging members and hook-formed straps operatively associated with the ends of said members and being adapted to removably engage the body handles of the receptacle, and wherein said members comprise like wire shapes having interior doubly offset portions terminating in loops and exterior elongated portions engaged by the loops of said interior offset portions, the ends of said elongated portions having loop formations, and wherein said straps comprise perforated bands, one end of the bands being bent upon itself and engaging the loop formations of said elongated portions, bolts fastening the bent ends of the bands to the bodies thereof, the other end of the bands being folded upon itself and formed into a hook of double thickness.

References Cited in the file of this patent
UNITED STATES PATENTS

| 2,524,632 | Morrison | Oct. 3, 1950 |
| 2,661,974 | Zehnder | Dec. 8, 1953 |

FOREIGN PATENTS

| 439,476 | Germany | Jan. 10, 1927 |